Feb. 12, 1963 A. B. BLACKBURN 3,077,026
METHOD OF MAKING A PERMANENT MAGNET ROTOR
Filed Nov. 12, 1959 2 Sheets-Sheet 1

INVENTOR
ALAN B. BLACKBURN
BY
*W. E. Fisher*
HIS ATTORNEY

INVENTOR.
ALAN B. BLACKBURN
BY
W.E. Finken
HIS ATTORNEY

United States Patent Office 3,077,026
Patented Feb. 12, 1963

3,077,026
METHOD OF MAKING A PERMANENT
MAGNET ROTOR
Alan B. Blackburn, Troy, Ohio, assignor to General
Motors Corporation, Detroit, Mich., a corporation of
Delaware
Filed Nov. 12, 1959, Ser. No. 852,567
2 Claims. (Cl. 29—155.53)

This invention pertains to dynamoelectric machines and particularly to an improved permanent magnet rotor assembly and method of making the same.

Heretofore, it has been customary in the manufacture of permanent magnet rotors to interconnect the permanent magnets with a shaft, or bearing support, by means of nonmagnetic cast material, such as aluminum. While this type of construction is satisfactory for low speed electrical machines, it cannot be used in high speed electrical machines, such as alternators driven by ram air driven turbines which operate at speeds of 12,000 r.p.m. or more. The present invention relates to an improved permanent magnet rotor assembly particularly designed for use in a ram air driven turbine and embodying unique means for maintaining the permanent magnet core in assembled relation with laminated pole plates. Accordingly, among my objects are the provision of an improved permanent magnet rotor assembly designed for high speed dynamoelectric machines; the further provision of a permanent magnet rotor assembly wherein the permanent magnet cores are held in compression; and the still further provision of a method of making an improved permanent magnet rotor assembly.

The aforementioned and other objects are accomplished in the present invention by establishing a shrink fit between the pole plates and the permanent magnet cores. Specifically, the improved permanent magnet rotor assembly comprises a pair of cores of permanent magnet material, such as Alnico, in the form of crosses and having centrally located circular apertures. The pole plate assembly comprises a plurality of laminated pole plates which are circumferentially spaced and adapted to engage each leg of the permanent magnet core. The laminated pole plates, which may be composed of silicon steel, are held in assembled relation by a plurality of laminated rings, with rivets extending therethrough. The pole plates and rings, when assembled, constitute a hoop assembly, having an octagonal internal configuration adapted to receive the cross-type core members.

Prior to assembly with the core members, the hoop assembly is placed in an oven and heated to approximately 600° F. thereby expanding the same. The two permanent cores are then press fitted into the hoop assembly, and the hoop assembly is allowed to cool to room temperature thereby establishing a shrink fit and holding the permanent magnet cores in compression. The voids, or spaces, between the core and the hoop assembly are thereafter filled with die cast nonmagnetic material, such as aluminum, which provides a damper circuit. In addition, integral end plates of aluminum are cast with projecting sleeves adapted to receive bearings for supporting the rotor assembly.

Further objects and advantages of the present invention will be apparent from the following description, reference being had to the accompanying drawing, wherein a preferred embodiment of the present invention is clearly shown.

Figure 1:
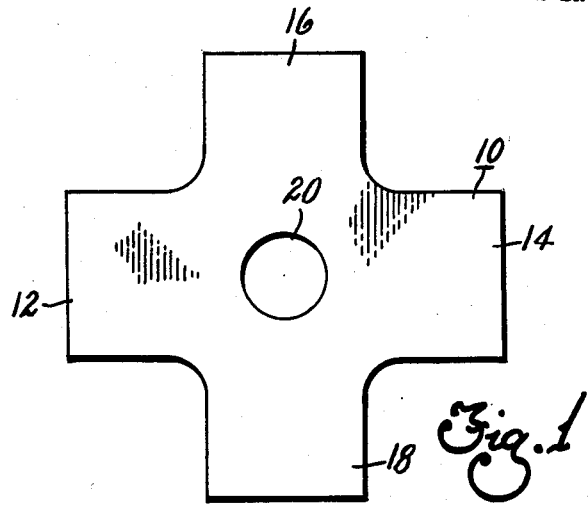
FIGURE 1 is an end view in elevation of one of the permanent magnet cores.

With particular reference to the drawing, the permanent magnet cores are depicted by numeral 10 in FIGURE 1 and have a cross-type configuration with pairs of diametrically opposed legs 12 and 14, and 16 and 18. In the specifically disclosed rotor, two cores 10 are used. Each core is formed with a centrally arranged circular opening 20 adapted to receive a drive shaft, not shown. The cores 10 are preferably composed of aluminum-nickel-cobalt alloy, known in the trade as Alnico.

Figure 2:
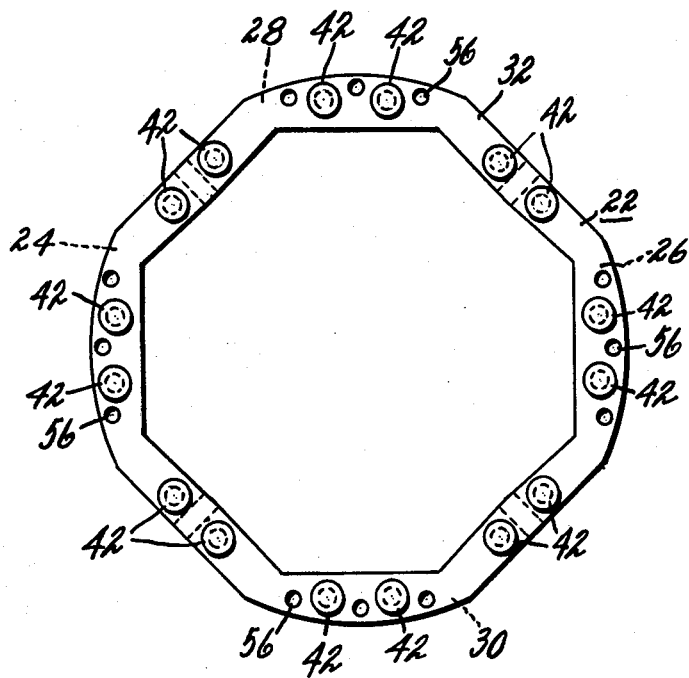
FIGURE 2 is an end view, in elevation, of the hoop assembly.
Figure 3:
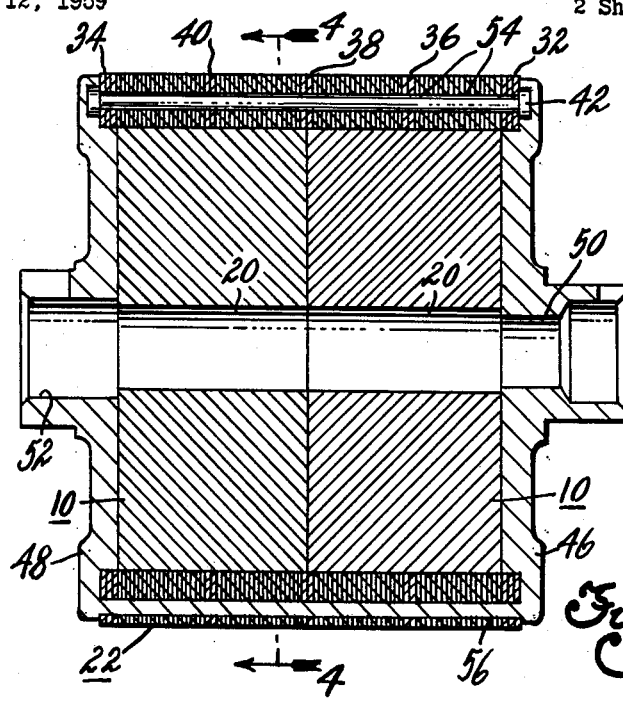
FIGURE 3 is a longitudinal, sectional view of the completed rotor assembly.

Referring to FIGURE 2, the cores 10 are designed to be received in a hoop assembly designated by numeral 22 comprising four circumferentially spaced sets of laminated pole plates 24, 26, 28 and 30 held in assembled relation by laminated end rings 32 and 34 with three sets of intermediate laminated rings 36, 38 and 40. The pole plates and the rings have aligned apertures 54 adapted to receive rivets which extend therethrough from end to end as indicated in FIGURE 3 and designated by numeral 42. The rings are formed with octagonal inner surfaces and outer surfaces which are alternatively flat and curved as depicted in FIGURE 2.

Figure 4:
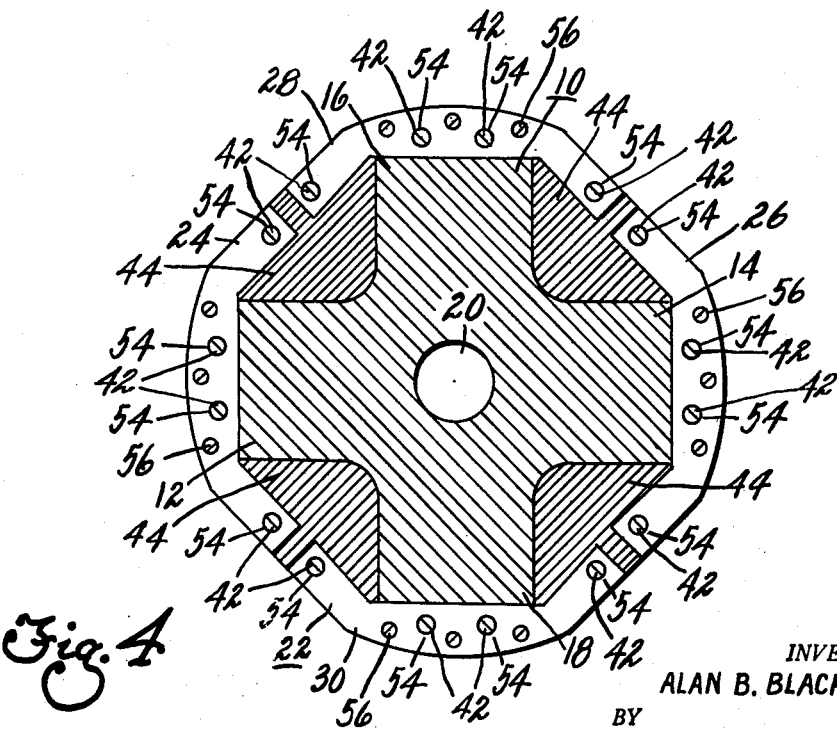
FIGURE 4 is a transverse sectional view taken along line 4—4 of FIGURE 3.

Prior to assembling the cores 10 with the hoop assembly 22, the hoop assembly is placed in an oven and brought to a temperature of approximately 600° F. This causes the hoop assembly to expand permitting the slightly oversized cores 10 to be press fitted thereinto, with the legs of the cores engaging alternate flat surfaces on the octagonal inner surfaces of the hoop assembly. More particularly, each of the legs of the core engages one of the sets of laminated pole plates. As shown in FIGURE 4, the legs 12 engage the laminated pole plates 24, the legs 14 engage the laminated pole plates 26, the legs 16 engage the laminated pole plates 28 and the legs 18 engage the laminated pole plates 30. The hoop assembly is then allowed to cool to room temperature, and in so doing contracts thereby establishing a shrink fit so as to rigidly interconnect the cores with the hoop assembly by maintaining the cores in compression.

The spaces, or voids, between the legs of the cross-type core members and the hoop assembly are thereafter filled with die cast nonmagnetic material, such as aluminum, indicated by numeral 44, which constitutes a damper circuit. The die cast aluminum is also used to form end plates 46 and 48 as well as integral sleeve type bearing supports 50 and 52, as shown in FIGURE 3. The rivets 42 only extend through the larger holes 54 of the hoop assembly, the smaller holes 56 being filled with the die cast aluminum material as shown in FIGURE 3.

The improved rotor assembly is particularly adapted for use in high speed dynamoelectric machines, such as ram air driven turbine-alternator combinations. By virtue of the fact that the permanent magnet cores are held in assembled relation with the laminated hoop assembly by a shrink fit, the rotor assembly is more durable and more reliable for high speed uses.

While the embodiment of the invention as herein disclosed constitutes a preferred form, it is to be understood that other forms might be adopted.

What is claimed is as follows:

1. The method of interconnecting a permanent magnet core with a laminated hoop assembly comprising the steps of heating the hoop assembly to expand the same, press fitting the core into the hoop assembly, and allowing the hoop assembly and core to cool to room temperature to establish a shrink fit between the hoop assembly and the core to maintain the core under compression.

2. The method of making a permanent magnet rotor assembly having a permanent magnet core with spaced legs and a laminated hoop assembly comprising the steps of heating the hoop assembly to a temperature of approximately 600° F., press fitting the core into the hoop assembly, allowing the hoop assembly to cool to room temperature thereby establishing a shrink fit between the hoop assembly and the core to hold the core in compression, and casting nonmagnetic material in the spaces between the legs of said core and the hoop assembly.

References Cited in the file of this patent

UNITED STATES PATENTS

| | | |
|---|---|---|
| 1,726,042 | Reis | Aug. 27, 1929 |
| 1,991,046 | Bohli | Feb. 12, 1935 |
| 2,000,715 | Penney | May 7, 1935 |
| 2,877,366 | Carr | Mar. 10, 1959 |

FOREIGN PATENTS

| | | |
|---|---|---|
| 216,169 | Great Britain | Mar. 10, 1924 |
| 217,877 | Switzerland | Feb. 16, 1942 |